US012627247B2

(12) United States Patent
Rougier et al.

(10) Patent No.: US 12,627,247 B2
(45) Date of Patent: May 12, 2026

(54) METHOD FOR THE VOLTAGE PROTECTION OF A MULTI-SOURCE ELECTRICAL SYSTEM

(71) Applicant: SAFRAN, Paris (FR)

(72) Inventors: Florent Rougier, Moissy-Cramayel (FR); Victor Dos Santos, Moissy-Cramayel (FR); Anne Marie Lienhardt, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/717,565

(22) PCT Filed: Dec. 8, 2022

(86) PCT No.: PCT/FR2022/052283
§ 371 (c)(1),
(2) Date: Jun. 7, 2024

(87) PCT Pub. No.: WO2023/105168
PCT Pub. Date: Jun. 15, 2023

(65) Prior Publication Data
US 2025/0055395 A1     Feb. 13, 2025

(30) Foreign Application Priority Data
Dec. 10, 2021     (FR) ........................................ 2113313

(51) Int. Cl.
*H02P 9/10*          (2006.01)
*F01D 15/10*         (2006.01)
(Continued)

(52) U.S. Cl.
CPC .............. *H02P 9/105* (2013.01); *F01D 15/10* (2013.01); *F05D 2220/76* (2013.01); *H02P 2101/25* (2015.01); *H02P 2101/30* (2015.01)

(58) Field of Classification Search
CPC .. H02P 9/105; H02P 2101/25; H02P 2101/30; F01D 15/10; F05D 2220/76; H02J 1/14; H02J 2310/44; H02J 1/12
See application file for complete search history.

(56) References Cited

U.S. PATENT DOCUMENTS

2010/0264724 A1    10/2010  Nelson et al.
2011/0071705 A1     3/2011  Matuszeski et al.
(Continued)

FOREIGN PATENT DOCUMENTS

EP         2 168 868 A2     3/2010
EP         2 168 868 A3     8/2016

OTHER PUBLICATIONS

French Preliminary Search Report completed Jul. 20, 2022 in French Application No. 2113313.
(Continued)

*Primary Examiner* — Joseph Ortega
(74) *Attorney, Agent, or Firm* — Sughrue Mion, PLLC

(57)          ABSTRACT
A method includes receiving an operating setpoint for an electrical power source, receiving a measurement of a voltage of an electrical bus connecting the electrical power source to an electrical receiver, comparing the measurement of the voltage with a template having limits of change over time for the voltage, and controlling the electrical power source such that if the measurement of the voltage lies within the limits of the template, the electrical power source applies the operating setpoint, and if the measurement of the voltage lies outside the limits of the template, the electrical power source regulates the voltage so as to restore the voltage to within the limits of the template. The method is implemented by a controller of the electrical power source.

7 Claims, 7 Drawing Sheets

(51) Int. Cl.
  H02P 101/25        (2016.01)
  H02P 101/30        (2015.01)

(56)                References Cited

U.S. PATENT DOCUMENTS

| 2014/0333127 | A1* | 11/2014 | Edwards | ................... | H02J 4/00 |
|---|---|---|---|---|---|
| | | | | | 307/9.1 |
| 2019/0058434 | A1 | 2/2019 | Yu | | |

OTHER PUBLICATIONS

International Search Report issued Mar. 27, 2023 in International Application No. PCT/FR2022/052283.

* cited by examiner

METHOD FOR THE VOLTAGE PROTECTION OF A MULTI-SOURCE ELECTRICAL SYSTEM

CROSS REFERENCE TO RELATED APPLICATIONS

This application is a National Stage of Application No. PCT/FR2022/052283 filed Dec. 8, 2022, claiming priority based on French Patent Application No. 2113313 filed Dec. 10, 2021, the contents of each of which being herein incorporated by reference in their entireties.

FIELD OF THE INVENTION

The present invention relates to the operating of an electrical system comprising an electrical bus connecting at least one electrical power source to an electrical receiver.

PRIOR ART

An electrical receiver is generally powered by an electrical power source via an electrical bus. However, the electrical bus may have a fault or the configuration thereof may change over time, and the electrical receiver may be disconnected from the electrical bus or, on the contrary, may cause an overload. Thereafter, the balance between the consumption of electric power by the electrical receiver, and the generation of electric power by the electrical power source, is perturbed. It follows that the stability of the voltage of the electrical bus may be jeopardized, which is likely to deteriorate the electrical power source, the electrical bus and/or the electrical receiver.

DISCLOSURE OF THE INVENTION

It is one objective of the invention to improve the operating of an electrical system wherein an electrical bus connects at least one electrical power source to an electrical receiver.

For this purpose there is proposed, in one aspect of the invention, a method of controlling the voltage of an electrical bus connecting an electrical power source to an electrical receiver, the control method being implemented by a controller of the electrical power source and comprising the steps of:

receiving an operating setpoint for the electrical power source;

receiving a measurement of the voltage of the electrical bus;

comparing the measurement of the voltage with a template having limits of change over time for the voltage;

controlling the electrical power source so that it:

applies the operating setpoint if the measurement of the voltage lies within the limits of the template, or regulates the voltage if the measurement of the voltage lies outside the limits of the template, so as to restore the voltage to within the limits of the template.

Advantageously, but optionally, the control method of the invention may comprise at least one of the following characteristics, taken alone or in any combination thereof:

the electrical power source regulates the voltage by injecting an electric power onto the electrical bus;

the electrical power source regulates the voltage by extracting an electric power from the electrical bus;

the operating setpoint is received from a control device of an electrical system comprising the electrical bus, the electrical power source and the electrical receiver, the control method further comprising a step of transmitting information to the control device concerning the application or non-application of the operating setpoint by the electrical power source; and the electrical power source can have a status compatible with the regulation of the voltage or a status incompatible with the regulation of the voltage, the control method further comprising a step of determining the status of the electrical power source, and wherein, if the status of the electrical power source is determined to be incompatible with regulation of the voltage, the electrical power source applies the operating setpoint even if the measurement of the voltage lies outside the limits of the template.

In another aspect of the invention, there is proposed a control method of the voltage of an electrical bus connecting a first electrical power source and a second electrical power source to an electrical receiver, the control method comprising:

implementing the control method as previously described by a first controller of the first electrical power source, by means of a first template; and implementing the control method as previously described by a second controller of the second electrical power source, by means of a second template;

wherein the first template differs from the second template so that one and/or the other of the first electrical power source and the second electrical power source is selectively controlled for the purpose of regulation of the voltage.

In another aspect of the invention, there is proposed a computer programme comprising instructions which, when the programme is executed on a computer, lead to implementation by the computer of the control method as previously described.

In another aspect of the invention, there is proposed a computer-readable medium comprising instructions which, when executed by a computer, lead to implementation by the computer of the control method as previously described.

In another aspect of the invention, there is proposed a controller of an electrical power source connected to an electrical receiver via an electrical bus, comprising a processor configured to implement the control method as previously described.

In another aspect of the invention, there is proposed an electrical system comprising an electrical power source, an electrical receiver, an electrical bus connecting the electrical power source to the electrical receiver, and a controller as previously described, the controller being configured to control the electrical power source.

Advantageously, but optionally, the electrical system as previously described is such that the electrical bus is a direct current bus, and the electrical power source is one from among:

a first assembly comprising a first electric generator connected to one from among a high pressure spool or low pressure spool of an aircraft engine, and a first converter;

a second assembly comprising a battery and a converter; and a third assembly comprising a second electric generator connected to an auxiliary power unit, and a second converter.

In another aspect of the invention, there is proposed another electrical system comprising a first electrical power source, a second electrical power source, an electrical receiver and an electrical bus connecting the first electrical power source and the second electrical power source to the electrical receiver, the system further comprising a first controller of the first electrical power source and a second controller of the second electrical power source, each comprising a processor configured to implement the control method as previously described.

Advantageously, but optionally, the other electrical system as previously described is such that:

the first electrical power source is a first assembly comprising a first electric generator connected to one from among a high pressure spool or low pressure spool of an aircraft engine, and a first converter;

the second electrical power source is one from among:
  a second assembly comprising a battery and a second converter, and
  a third assembly comprising a second electric generator connected to an auxiliary power unit, and a third converter; and the electrical bus is a direct current bus.

Alternatively, but still optionally, the other electrical system as previously described is such that:

the first electrical power source is a first assembly comprising a first electric generator connected to a high pressure spool of an aircraft engine, and a first converter;

the second electrical power source is a second assembly comprising a second electric generator connected to a low pressure spool of an aircraft engine, and a second converter; and the electrical bus is a direct current bus.

Alternatively, but still optionally, the other electrical system as previously described is such that:

the first electrical power source is a first assembly comprising a battery and a first converter;

the second electrical power source is a second assembly comprising a second electric generator connected to an auxiliary power unit, and as second converter; and the electrical bus is a direct current bus.

In another aspect of the invention, there is proposed an aircraft comprising an engine and one or other of the electrical systems according to the advantageous forms previously described.

DESCRIPTION OF THE FIGURES

Other characteristics, objectives and advantages of the invention will become apparent from the following description which is solely illustrative and nonlimiting, and is to be read in connection with the appended drawings in which.

In all the Figures, similar elements carry same references.

DETAILED DESCRIPTION OF THE INVENTION

Electrical System

Figure 1:
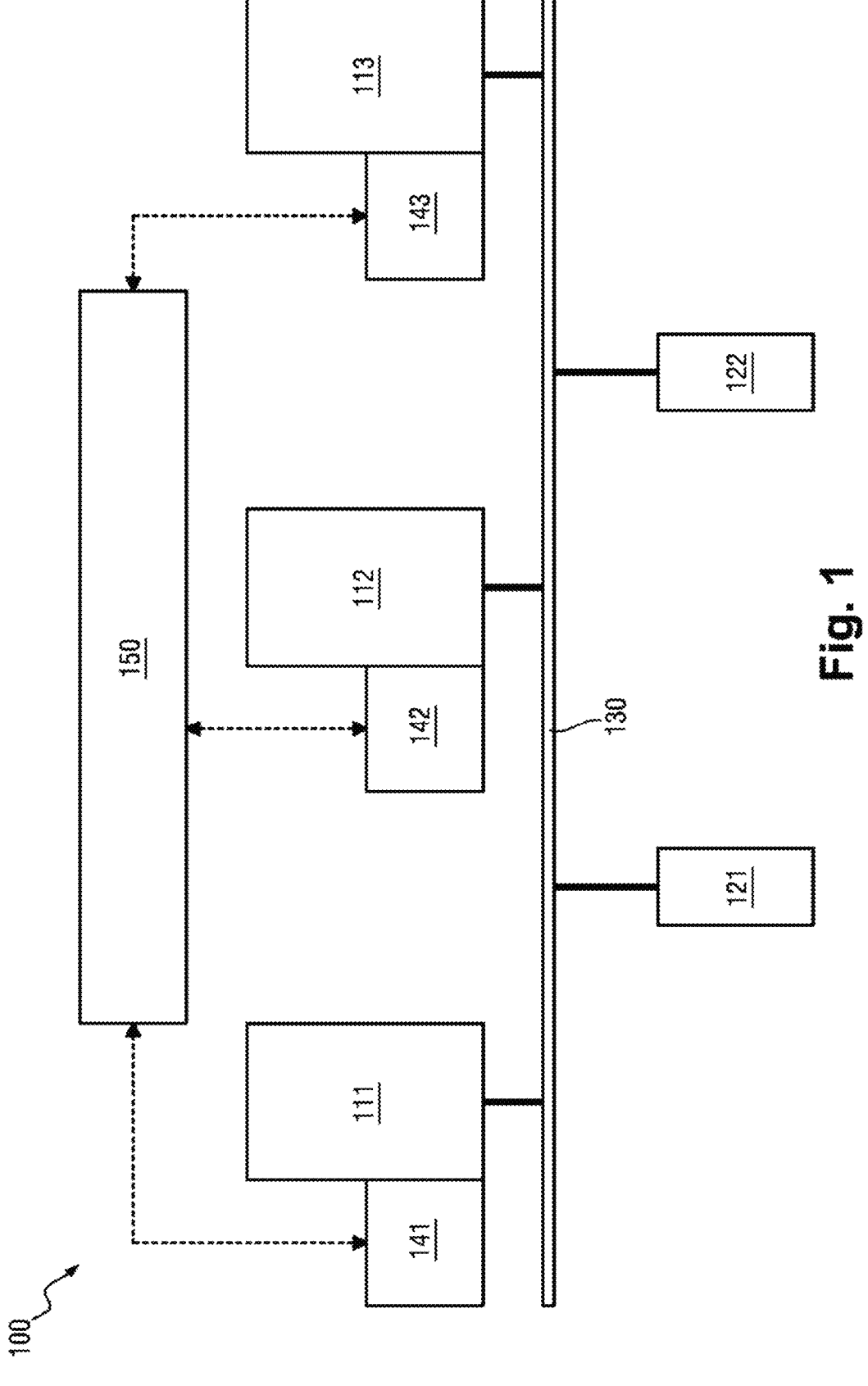
FIG. 1 schematically illustrates an electrical system according to one embodiment of the invention.

With reference to FIG. 1, an electrical system 100 comprises an electrical power source 111, 112, 113, preferably several electrical power sources 111, 112, 113, typically a first electrical power source 111 and a second electrical power source 112. The electrical power source 111, 112, 113 is a device configured to supply or evacuate electric energy (or power) in various forms such as an alternating or direct signal. The electrical power source 111, 112, 113 can be a voltage source, typically independent of current output, or it can be a current source typically independent of delivered voltage. Nonlimiting examples of electrical power sources 111, 112, 113 are: an assembly comprising an electric generator and an electrical converter, a battery, a fuel cell etc. Preferably the electrical power source 111, 112, 113 is a direct current source.

As can be seen in FIG. 1, the electrical system 100 also comprises an electrical receiver 121, 122 (or electric load), preferably several electrical receivers 121, 122. The electrical receiver 121, 122 is a device powered by electric energy and able to be configured to convert the received electric energy to another form of energy such as heat or mechanical energy. Nonlimiting examples of electrical receivers 121, 122 are: an electric motor, heating and/or air conditioning system, compressor, etc.

As can also be seen in FIG. 1, the electrical system 100 further comprises an electrical bus 130 connecting the electrical power source(s) 111, 112, 113 to the electrical receiver(s) 121, 122. The electrical bus 130 typically comprises an assembly of electricity conductors, typically an assembly of wire(s) or bar(s), and/or an assembly of wire(s) and/or one or more printed tracks, and/or any apparatus of any kind used to conduct electricity. The electrical bus 130 can additionally allow the circulation of electric energy in the form of an alternating and/or direct signal, preferably direct. Advantageously, the electrical system 100 comprises measuring equipment (not illustrated) to measure the voltage of the electrical bus 130, which is globally the same irrespective of the position within the electrical bus 130 and substantially corresponds to the input voltage of the electrical receiver(s) and/or output voltage from the electrical power sources 111, 112, 113. Also, the measuring equipment is adapted to exchange information, via material means e.g. via a communication bus and/or via immaterial means typically via a Bluetooth or Wi-Fi connection, with a controller 141, 142, 143 and/or an aircraft control device 150 such as described below. Typically, the measuring equipment is configured to measure the voltage and/or change over time of the voltage of the electrical bus 130 and to transmit the measurement to the controller 141, 142, 143 and/or control device 150.

Figure 2:
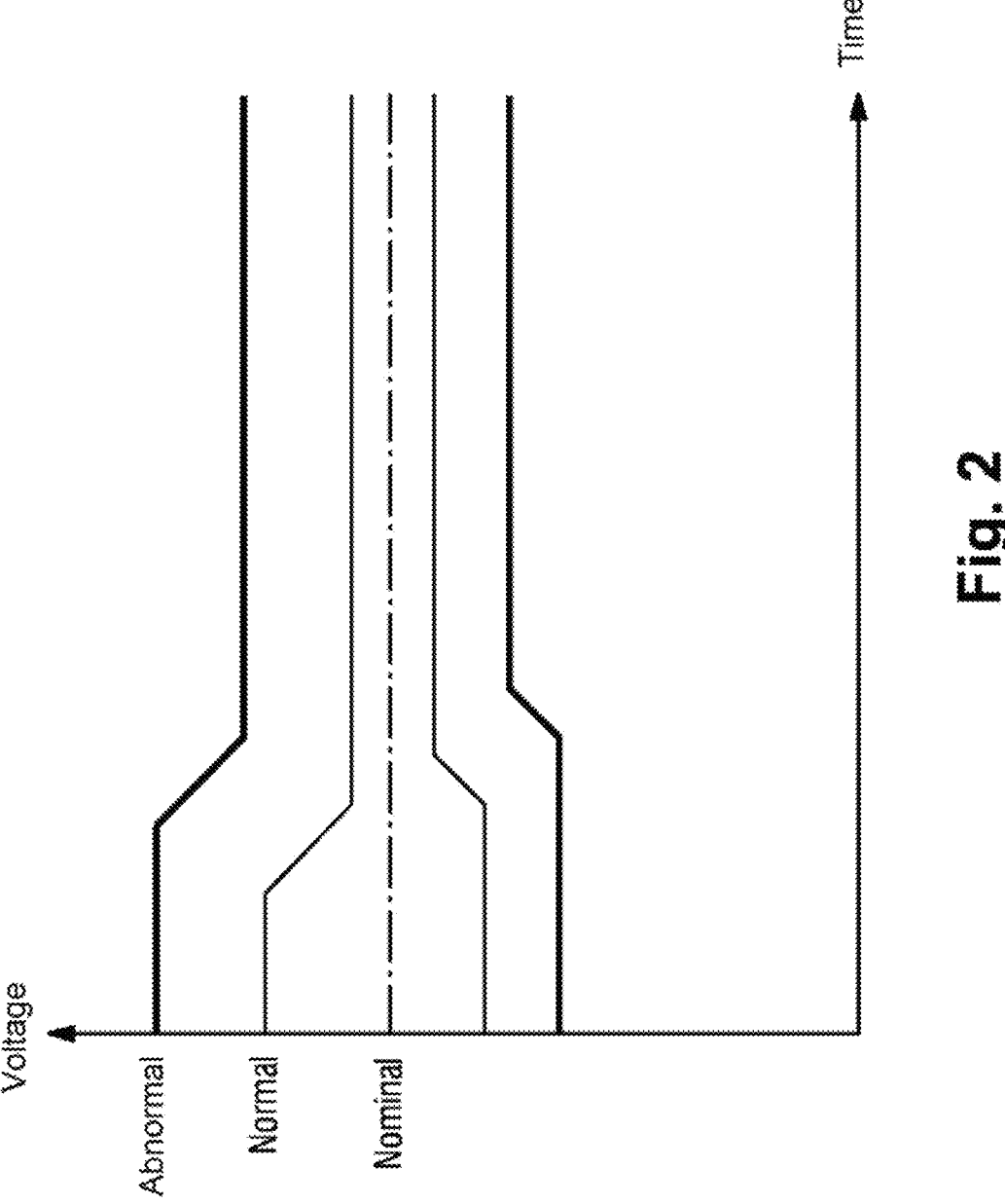
FIG. 2 illustrates a template to regulate the voltage of an electrical bus.

With reference to FIG. 2, the change over time of the voltage in the electrical bus when the electrical system 100 is in operation, must remain within the limits of a template even if, evidently, it may sporadically vary around a given nominal value. In other words, for proper operating of the electrical power source(s) 111, 112, 113 and/or of the electrical receiver(s) 121, 122 connected to the electrical bus 130, the voltage must not take on value(s) which exceed the limits of the template. The template defines the upper and lower limits of voltage swing over time when the electrical system 100 is in operation. As can be seen in FIG. 2, the template may comprise limits defined for normal and/or abnormal operating conditions, these limits whether or not symmetrically surrounding a nominal voltage level of the electrical bus 130. In a diagram giving voltage change over time, a template limit is typically represented as a broken or unbroken line as can be seen for example in FIG. 2.

Preferably, even if the limit does not initially define a constant voltage value, generally associated with the characteristic startup time of the electrical system 100, the limit usually defines a subsequent constant voltage value as illustrated in FIG. 2, to guarantee the stable operation of the electrical bus 130 and hence of the electrical system 100. Said template can be defined for example by a standard relating to the quality of the electrical system 100 and/or of the electricity network (not illustrated) to which the electrical system 100 is connected, but can also be defined by the specifications of the equipment to which the electrical system 100 is connected, typically by manufacturer requirements of aircraft in which the electrical system 100 is integrated.

Figure 5:
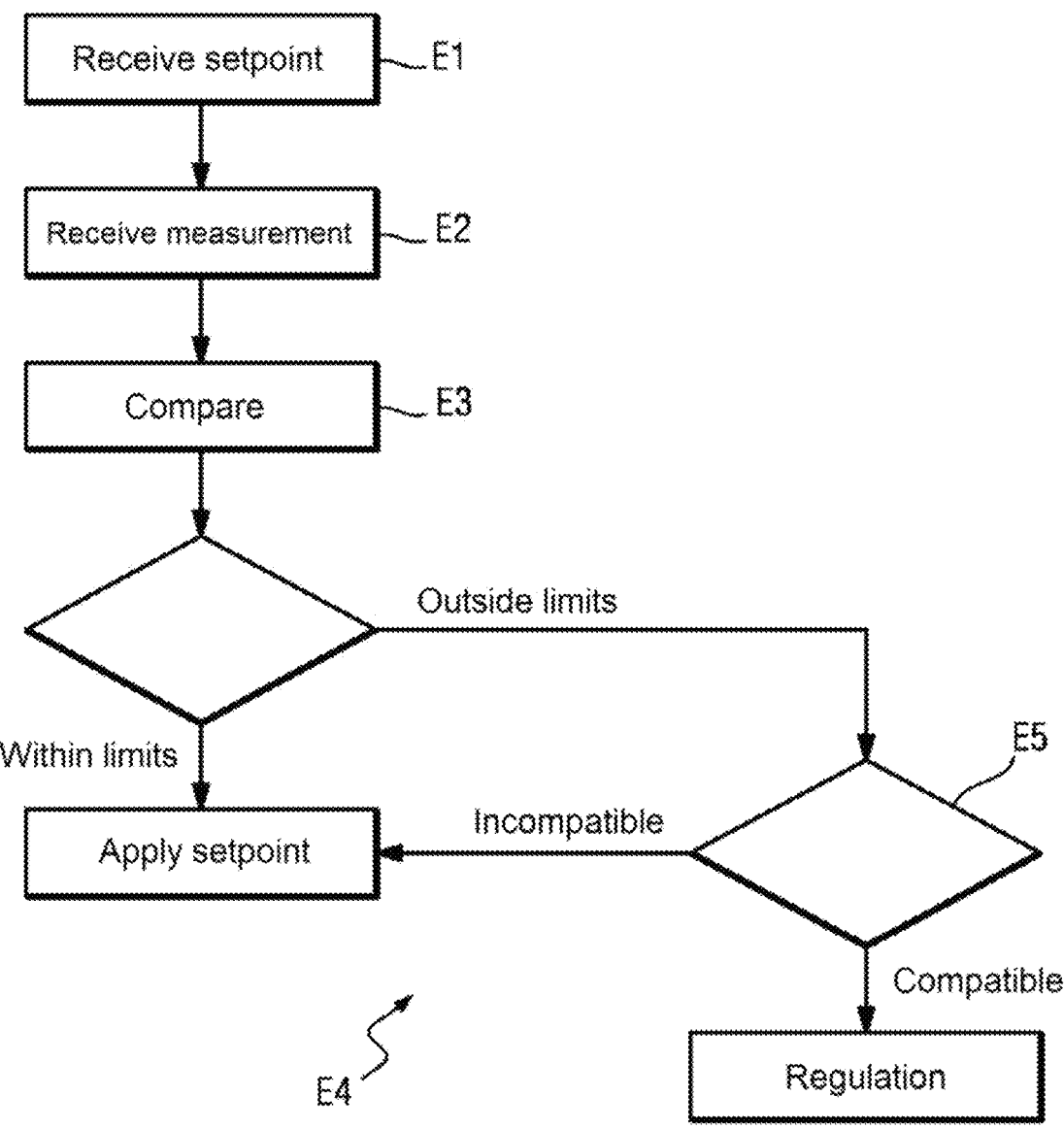
FIG. 5 is a flow diagram of steps of a control method according to one embodiment of the invention.

Returning to FIG. 1, the electrical system 100 comprises a controller 141, 142, 143 of the electrical power source 111, 112, 113, preferably several controllers 141, 142, 143, one for each electrical power source 111, 112, 113, typically a first controller 141 of the first electrical power source 111 and a second controller 142 of the second electrical power source 112. The controller 141, 142, 143 comprises a processor (not illustrated) configured to implement a method E to control the electrical power source 111, 112, 113 described in more detail with reference to FIG. 5. The processor of the controller 141, 142, 143 is adapted to read a computer-readable medium comprising instructions which, when executed by a computer such as the processor of the controller 141, 142, 143, lead to implementation by the controller of the control method E of the electrical power source 111, 112, 113. The computer-readable medium and/or controller 141, 142, 143 are configured to load a computer programme, typically in a memory, comprising instructions which, when the programme is executed by a computer such as the processor of the controller 141, 142, 143, enable the latter to implement the control method E of the electrical power source 111, 112, 113. In this respect, the controller 141, 142, 143 may comprise a memory (not illustrated).

Also, as illustrated in FIG. 1, the electrical system 100 advantageously comprises a control device 150 of at least one part of the electrical system 100 i.e. to monitor the (or at least one of the) electrical power sources 111, 112, 113, the electrical bus 130 and/or the (or at least one of the) electrical receivers 121, 122. The control device 150 is more particularly adapted to exchange information, via material means e.g. via a communication bus and/or immaterial means typically via Bluetooth or Wi-Fi communication, with the control device(s) 141, 142, 143. In this manner, the control device 150 is able to transmit an operating setpoint for the electrical power source(s) 111, 112, 113, the operating setpoint possibly being for example instructions for one from among the startup of the electrical power source 111, 112, 113, the injection and/or extraction of electric power on the electrical bus 130, standby, regulation of the voltage of the electrical bus 130, etc. The operating setpoint controlling the injection and/or extraction of electric power on the electrical bus 130 may or may not impose the power level to be injected and/or extracted. In the latter case, the electrical power source 111, 112, 113 is in regulation mode of the power transmitted to the electrical receiver(s) 121, 122. The control device 150 is therefore able for example to control sharing of electric power between the different electrical power sources 111, 112, 113. Depending on the received operating setpoint, the electrical power source(s) 111, 112, 113 can have an initial status compatible with regulation of the voltage of the electrical bus 130 or a status incompatible with regulation of the voltage of the electrical bus 130. Typically, on startup of the electrical power source(s) 111,

112, 113, the latter are not able to carry out regulation of the voltage of the electrical bus 130. The same applies when the electrical power source(s) 111, 112, 113 are switched off or disconnected from the electrical system 100, or have a fault for example. In this case, the status of the electrical power source(s) 111, 112, 113 is incompatible with regulation of the voltage of the electrical bus 130. On the contrary, when the initial status of the electrical power source(s) 111, 112, 113 is in power regulation mode (injection or extraction), on standby or regulation of the voltage mode of the electrical bus 130, they are in a mode compatible with regulation of the voltage of the electrical bus 130.

The electrical system 100 in FIG. 1 is therefore preferably multi-source and controlled in decentralized or distributed manner typically by the control device 150, each electrical power source 111, 112, 113 able to be in an operating mode (e.g. startup, power regulation, on standby, regulation of the voltage) differing from the modes of the other electrical power sources 111, 112, 113, said modes possibly changing throughout operating time and typically after receiving a setpoint from the control device 150. In addition, in this electrical system 100, the electrical power source(s) 111, 112, 113 do not communicate with each other. In particular, the electrical power source(s) 111, 112, 113 do not coordinate with each for example to regulate the voltage of the electrical bus 130. Also, the electrical power source(s) 111, 112, 113 and electrical receiver(s) 121, 122 are arranged in parallel on the electrical bus 130.

The electrical system 100 illustrated in FIG. 1 can be used in any application necessitating exchanges of electric energy. Typically, as described below in more detail with reference to FIG. 4 and FIG. 5, the electrical system 100 can be used in the field of aeronautics, for example being partly integrated in an aircraft engine such as illustrated in FIG. 3.

Aircraft Engine

Figure 3:
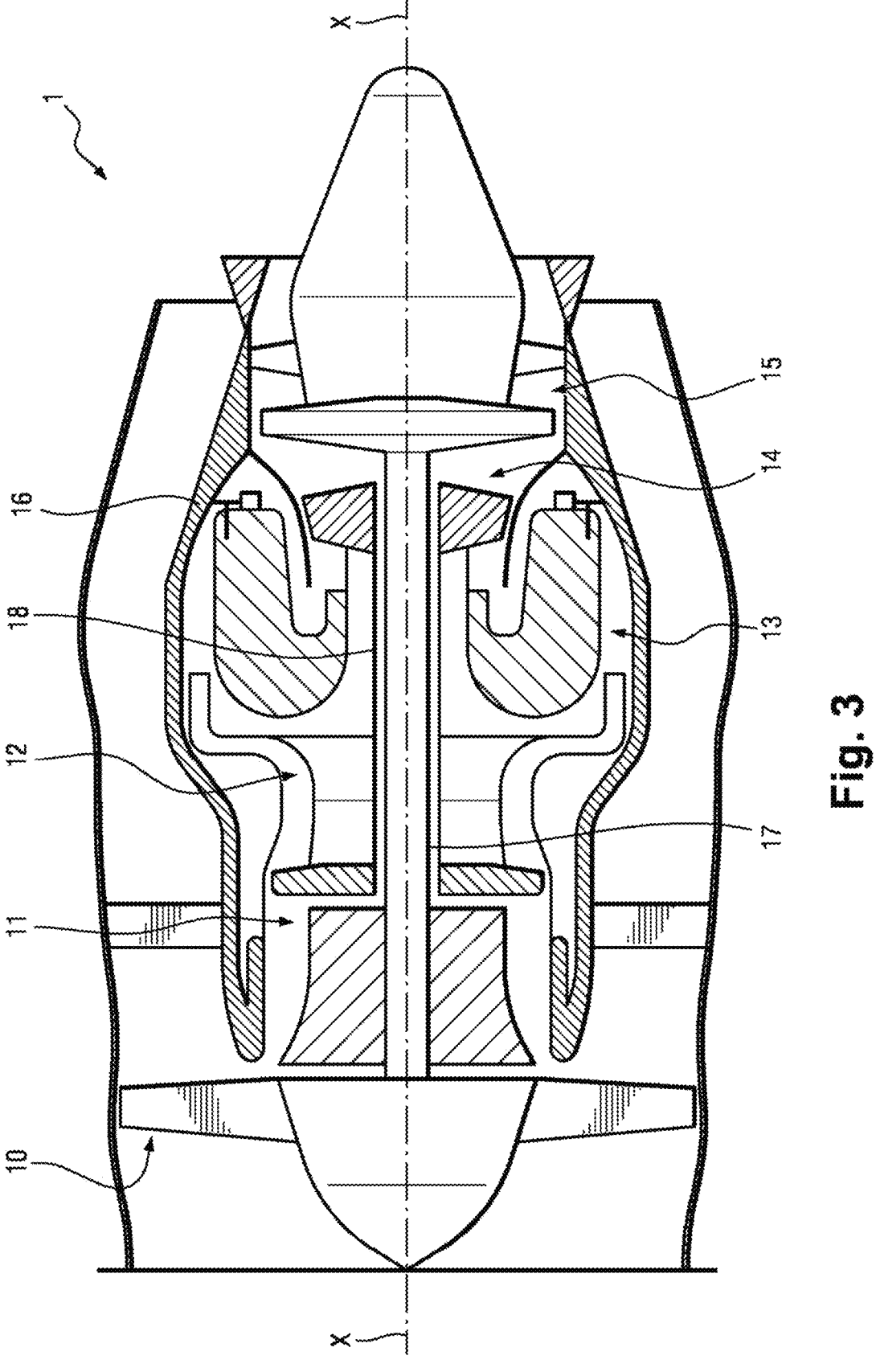
FIG. 3 schematically illustrates a cross-sectional view of an aircraft engine.

FIG. 3 illustrates an engine 1 (or gas turbine engine) which generally extends along a longitudinal axis X-X, being intended for example to be mounted on an aircraft (not illustrated) such as an airplane or helicopter, for example under the wing of the aircraft, on the wing, or aft of the aircraft fuselage.

The engine 1 illustrated in FIG. 3 is a twin spool turbofan engine with direct drive. This is not limiting however since it is possible that the engine 1 may not be intended to be mounted on an aircraft, or it may comprise a different number of spools and/or fan flows, and/or can be another type of turbine engine such as a geared turbojet or turboprop.

Unless otherwise specified, the terms «upstream» and «downstream» are used with reference to the overall direction of the flow of gases through an engine 1 when in operation. As can be seen in FIG. 3, the engine 1 from upstream to downstream, comprises a fan 10, a compressor section comprising a low pressure compressor 11 and a high pressure compressor 12, a combustion chamber 13 and a turbine section comprising a high pressure turbine 14 and low pressure turbine 15. The longitudinal axis X-X forms a rotation axis of at least one part of the compressor section and turbine section which are able to be driven in rotation about the longitudinal axis X-X relative to a casing 16 of the engine 1. The fan 10, the low pressure compressor 11 and low pressure turbine 15 are linked together by a low pressure shaft 17 extending along the longitudinal axis X-X to form the low pressure spool 10, 11, 15, 17. The high pressure compressor 12 and high pressure turbine 14 are linked together via a high pressure shaft 18 extending along the longitudinal axis X-X to form the high pressure spool 12, 14, 18.

When in operation, the fan 10 draws in an airflow of which one portion circulating within the primary airstream is successively compressed in the compressor section, ignited in the combustion chamber 13 and expanded in the turbine section before being ejected outside the engine 1. In this manner, the engine 1 generates thrust. This thrust can be used by the aircraft for example on which the engine 1 is added and secured.

Figure 4:
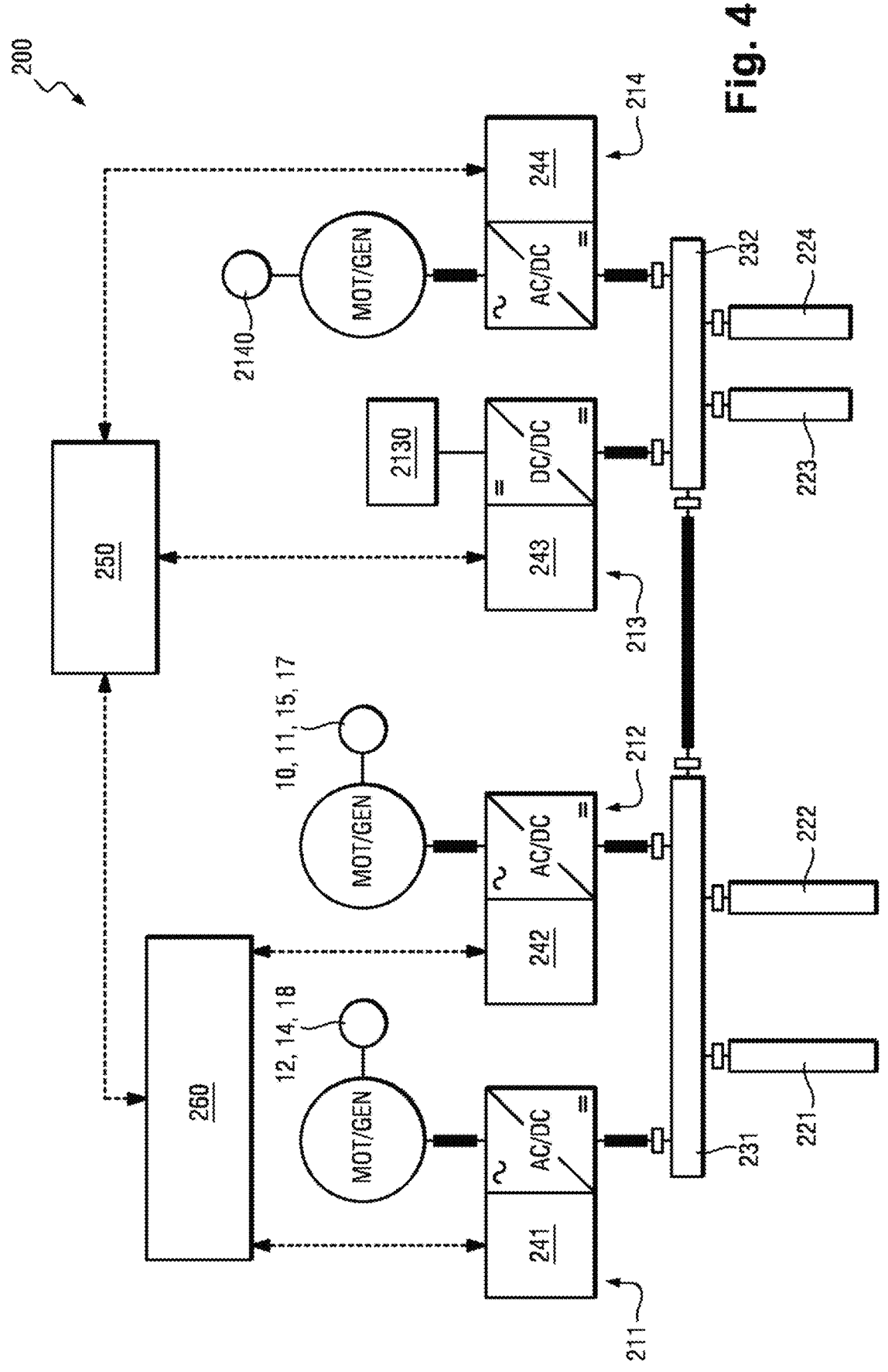
FIG. 4 schematically illustrates an electrical system according to one embodiment of the invention.

The aircraft also comprises an electricity network of which part is illustrated in FIG. 4, to ensure a certain number of functionalities in flight and on the ground, such as pressurization and/or lighting of the aircraft cabin, functioning of the cockpit, etc. As described in more detail below, the electricity network of the aircraft comprises at least one electrical receiver 223, 224, preferably a plurality of electrical receivers 223, 224, at least one electrical power source 213, 214, preferably several electrical power sources 213, 214, the electrical receiver(s) being connected to the electrical power source(s) 223, 224 via an electrical bus 232, and an aircraft control device 250. In addition, as described in more detail below, the engine 1 comprises at least one electrical receiver 221, 222, preferably a plurality of electrical receivers 221, 222, such as an ignition device to start up the engine 1 of the aircraft or a de-icing system of the engine 1, at least one electrical power source 211, 212, preferably several electrical power sources 211, 212, the electrical receiver(s) being connected to the electrical power source(s) 221, 212 via an electrical bus 231, and an engine control device 260.

FIG. 4 illustrates one embodiment of the electrical system 200 which is distributed between the engine 1 and the aircraft to link together the mechanical and/or electrical components of the engine 1 (low pressure spool 10, 11, 15, 17, high pressure spool 12, 14, 18, electrical receivers 221, 222 of the engine 1) to the mechanical and/or electrical components of the aircraft (battery 2130, auxiliary power unit 2140, electrical receivers 223, 224 of the aircraft's electricity network). In other words, the electrical system 200 ensures the interface between the mechanical and/or electrical components of the engine 1 and the mechanical and/or electrical components of the aircraft.

The electrical system 200 comprises several electrical power sources 211, 212, 213, 214, each being connected to an electrical bus 231, 232: a first assembly 211 comprising a first electric generator connected to the high pressure spool 12, 14, 18 and a converter; a second assembly 212 comprising a second electric generator connected to the low pressure spool 10, 11, 15, 17 and a converter; a third assembly 213 comprising a battery 2130 and a converter; and a fourth assembly 214 comprising a third electric generator connected to an auxiliary power unit 2140 and a converter. The auxiliary power unit 2140 itself comprises an engine (or turbine engine), typically having possibly the same structure as the engine 1 illustrated in FIG. 3. As can be seen in FIG. 4, each of these electrical power sources 211, 212, 213, 214 is connected to the electrical bus 231, 232 in parallel with the other electrical power sources 211, 212, 213, 214. In addition, each of the first electric generator, second electric generator and third electric generator is associated with a converter of alternating current to direct current. The electrical bus 231, 232 operates on direct current, whilst the high pressure spool 12, 14, 18, and low pressure spool 10, 11, 15, 17 and auxiliary power unit 2140 each tend to generate an alternating current via the electric generators functioning as electric motors. The converter of the third assembly 213 allows the level of direct voltage of the battery 2130 to be adapted to the level of direct voltage of the electrical bus 231, 232. Also, as illustrated in FIG. 4, the electrical bus 231, 232 comprises two parts, the first assembly 211 and the second assembly 212 being connected to a first part 231, which is typically integrated in the engine 1, whilst the third assembly 213 and fourth assembly 214 are connected to a second part 232 separate from the second part 232 but electrically connected to the first part. The second part 232 is typically integrated in the aircraft. This allows optimized arrangement of the electrical system 200 within the engine 1 and/or aircraft.

FIG. 4 also shows that each electrical power source 211, 212, 213, 214 is equipped with a controller 241, 242, 243, 244 configured to control the operation thereof according to the control method E described in more detail below.

The electrical system 200 illustrated in FIG. 4 also comprises a plurality of electrical receivers 221, 222, 223, 224, each connected to one or other among the first part 231 and second part 232 of the electrical bus 231, 232. These electrical receivers 221, 222, 223, 224 are integrated in and of use for the engine 1 (electrical receivers 221, 222) and/or for the aircraft (electrical receivers 223, 224), when needed.

Each of the controllers 241, 242 of the first assembly 211 and of the second assembly 212 is controlled by an engine control device 260, which is configured in particular to ensure distribution of the electric power injected into and/or extracted from the electrical bus 231 by either of the first assembly 211 and second assembly 212, depending on the operating speed of the engine 1. For this purpose, the engine control device 260 is adapted to exchange information via material means e.g. via a communication bus and/or via immaterial means typically via a Bluetooth or Wi-Fi connection, with each of the controllers 241, 242 of the first assembly 211 and second assembly 212.

Finally, the electrical system 200 comprises an aircraft control device 250 adapted to exchange information via material means route e.g. via a communication bus and/or via immaterial means typically via a Bluetooth or Wi-Fi connection, with each of the controllers 243, 244 of the third assembly 213 and fourth assembly 214 and/or with the engine control device 260.

In nominal operation, the electrical system 200 illustrated in FIG. 4 behaves according to various operating modes of which some are detailed below. In a first operating mode, the electrical system 200 has a power generation function aided by the engine 1 for example to power the electricity network of the aircraft whilst controlling the sharing of electric power supplied by each of the first assembly 211 and second assembly 212. In a second operating mode, the electrical system has an assistance function for the engine 1 for example so that the electricity network of the aircraft is able to supply electric power to the engine 1. In a third operating mode, the electrical system 200 can operate under imposed output so that the first assembly 211 and/or second assembly 212 supplies an imposed electric power to the electricity network. In a fourth operating mode, the electrical system 200 operates under startup mode so that the electricity network of the aircraft supplies the engine 1 with the power needed for startup.

To ensure this nominal operation, the electrical system 200 behaves more specifically as follows.

The first assembly 211 and/or second assembly 212 have various operating modes, each corresponding to a certain number of operating setpoints received by the corresponding controllers 241, 242 from the engine control device 260, including: engine startup, electricity generation and engine assistance. On engine startup, one among the third assembly 213 and/or fourth assembly 214 generates (or injects) electric power onto the electrical bus 232, at least part of said electric power being extracted by the first assembly 211 and/or second assembly 212 to drive in rotation the high pressure spool 12, 14, 18 and/or low pressure spool 10, 11, 15, 17 about the longitudinal axis X-X. At an electricity generation phase, the first assembly 211 and/or second assembly 212 injects electric power on the electrical bus 231, said electric power is extracted from the electrical bus 231, 232 by one or more electrical receivers 221, 222, 223, 224, typically for loads other than propulsion of the aircraft. In assistance mode of the engine 1, an electric power imposed by the engine control device 260 is injected or output from one among the first assembly 211 and/or second assembly 212. In other words, in assistance mode of the engine 1, the first assembly 211 and/or second assembly 212 are in power regulation mode of the electrical system 200.

The third assembly 213 also has various operating modes, each corresponding to a certain number of operating setpoints received by the corresponding controller 243 from the aircraft control device 250, including: charge and discharge. On charge, the third assembly 213 extracts electric power from the electrical bus 232 to store electric energy in the battery 2130. On discharge, the third assembly 213 injects electric power extracted from the battery 2130 onto the electrical bus 232, to supply the electrical receivers 221, 222, 223, 224 with electric energy, to start up the engine 1 in the engine assistance injection mode previously described, and/or to start up the auxiliary power unit 2140.

The fourth assembly 214 also has various operating modes, each corresponding to a certain number of operating setpoints received by the corresponding controller 244 from the aircraft control device 250, including: startup of the auxiliary power unit and electricity generation. On startup of the auxiliary power unit, the fourth assembly 214 extracts electric power from the electrical bus 232 to start up the engine of the auxiliary power unit 2140, said electric power having been injected by another power source 211, 212, 213, typically the third assembly 213. During an electricity generation phase, the fourth assembly 214 injects electric power onto the electrical bus 232, to supply the electrical receivers 221, 222, 223, 224 with electric energy, start up the engine 1 in the engine assistance injection mode previously described and/or to store electric energy in the battery 2130.

In one example of abnormal operation, which can be prevented by the control method E described in more detail below, the electrical system 200 might find itself in an operating mode in which: the first assembly 211 extracts electric power from the electrical bus 231, the second assembly 212 is on standby, the third assembly 213 is under discharge and the fourth assembly 214 has a fault making it unavailable. In this example, if the battery 2130 itself should no longer be available, then there would no longer be any electric power source to control the voltage of the electrical bus 231, 232.

In another example of abnormal operation, which can be prevented by the control method E described in more detail below, the electrical system 200 might find itself in an operating mode in which: the first assembly 211 extracts electric power from the electric bus 231 and the second assembly 212 is on standby. Should the electricity network be disconnected from the engine 1 and the electrical system 200, typically if the first part 231 is disconnected from the second part 232, then there would no longer be any electric power source to control the voltage of the first part 231 of the electrical bus.

Therefore, to ensure controlling of the voltage of the electrical bus 231, 232, it is necessary that at least one electrical power source 211, 212, 213, 214 still controls the voltage of the electrical bus 231, 232. Failing this, if the electric power injected onto the electrical bus 231, 232 is lower than the electric power extracted from the electrical bus 231, 232, the value of the voltage of the electrical bus 231, 232 would drop. Similarly, if the electric power injected onto the electrical bus 231, 232 is higher than the electric power extracted from the electrical bus 231, 232, the value of the voltage of the electrical bus 231, 232 would increase. It is even possible to have drift in the value of the voltage of the electrical bus 231, 232 if an electrical power source controls the voltage of the electrical bus 231, 232 but is incapable of supplying the corresponding electric power. This drift in the value of the voltage of the electrical bus 231, 232 can occur very rapidly in time. For example, for a 900 VDC network and bus capacity of 1 mF, a difference of 10 KW between generation and consumption entails a drift in bus voltage of more than 100V in 10 ms.

Control Method

When in operation, it may therefore prove to be necessary to control the voltage of the electrical bus 130, 231, 232, to guarantee the stability and integrity of the electrical system 100, 200. To do so, the controller 141, 142, 143, 241, 242, 243, 244 of the electrical power source 111, 112, 113, 211, 212, 213, 214 comprises a processor (not illustrated) configured to implement the control method E illustrated in FIG. 5. This is not limiting however, since the control method E illustrated in FIG. 4 can also be implemented by any suitable technical means able to act on the electrical power source(s) 111, 112, 113, 211, 212, 213, 214 of the electrical system 100, 200.

As illustrated in FIG. 4, the control method E comprises a receiving step E1 of an operating setpoint for the electrical power source 111, 112, 113, 211, 212, 213, 214. Preferably, this operating setpoint is received from the control device 150, 250, 260.

Also, the control method E comprises a receiving step E2 of a measurement of the voltage of the electrical bus 130, 231, 232. Preferably, this measurement is performed by the measuring equipment which transmits the measurement result to the controller 141, 142, 143, 241, 242, 243, 244.

The control method E further comprises a comparison step E3 of the received measurement of the voltage with a template having limits for voltage change over time, typically the one illustrated in FIG. 2. In practice, this step entails determining whether the measurement of the voltage lies within or outside the limits of the template. By convention, when the measurement of the voltage lies exactly at a limit of the template, it is considered that the measurement of the voltage lies within the template range.

In addition, the control method E comprises a step E4 to control the electrical power source 111, 112, 113, 211, 212, 213, 214. At this step, the electrical power source 111, 112, 113, 211, 212, 213, 214 is controlled via application of the received operating setpoint if the measurement of the voltage lies within the limits of the template. In this case, the voltage level is such that the risk of damage to all or part of the electrical system 100, 200 is limited. Therefore, the operating setpoint can be applied by the electrical power source 111, 112, 113, 211, 212, 213, 214. On the other hand, if the measurement of the voltage lies outside the limits of the template, the electrical power source 111, 112, 113, 211, 212, 213, 214 is controlled by potential to restore the voltage level to within the limits of the template. In other words, the electric power source 111, 112, 113, 211, 212, 213, 214 is controlled by potential in a manner to ignore the received operating setpoint and to give preference to regulation of the voltage of the electrical bus 130, 231, 232. In one variant, this regulation entails the injection of an electric power onto the electrical bus 130, 231, 232, by the electrical power source 111, 112, 113, 211, 212, 213, 214. In another variant, this regulation entails extraction of an electric power from the electrical bus 130, 231, 232, by the power source. The level of power injected into and/or extracted from the electrical bus 130, 231, 232 is adapted to restore the voltage to within the limits of the template.

In one advantageous embodiment, illustrated in FIG. 3, the control method E comprises a step E5 to determine the status of the electrical power source 111, 112, 113, 211, 212, 213, 214. For example, if the status of the electrical power source 111, 112, 113, 211, 212, 213, 214 is determined to be incompatible with regulation of the voltage, the electrical power source 111, 112, 113, 211, 212, 213, 214 applies the operating setpoint even if the measurement of the voltage lies outside the limits of the template. On the contrary, if determined compatible, the electrical power source 111, 112, 113, 211, 212, 213, 214 regulates the voltage to bring the voltage level back within the limits of the template.

In one advantageous embodiment (not illustrated) the control method E comprises a step to transmit information to the control device 150, 250, 260 concerning the application or non-application of the operating setpoint by the electrical power source 111, 112, 113, 211, 212, 213, 214. In this manner, the control device De 150, 250, 260 can be kept informed of the status of the electrical system 100, 200 and more particularly of the electrical bus 130, 231, 232. Additionally, the control device 150, 250, 260 can take suitable measures if the operating setpoint it has transmitted is not applied by the electrical power source 111, 112, 113, 211, 212, 213, 214.

Figure 6:
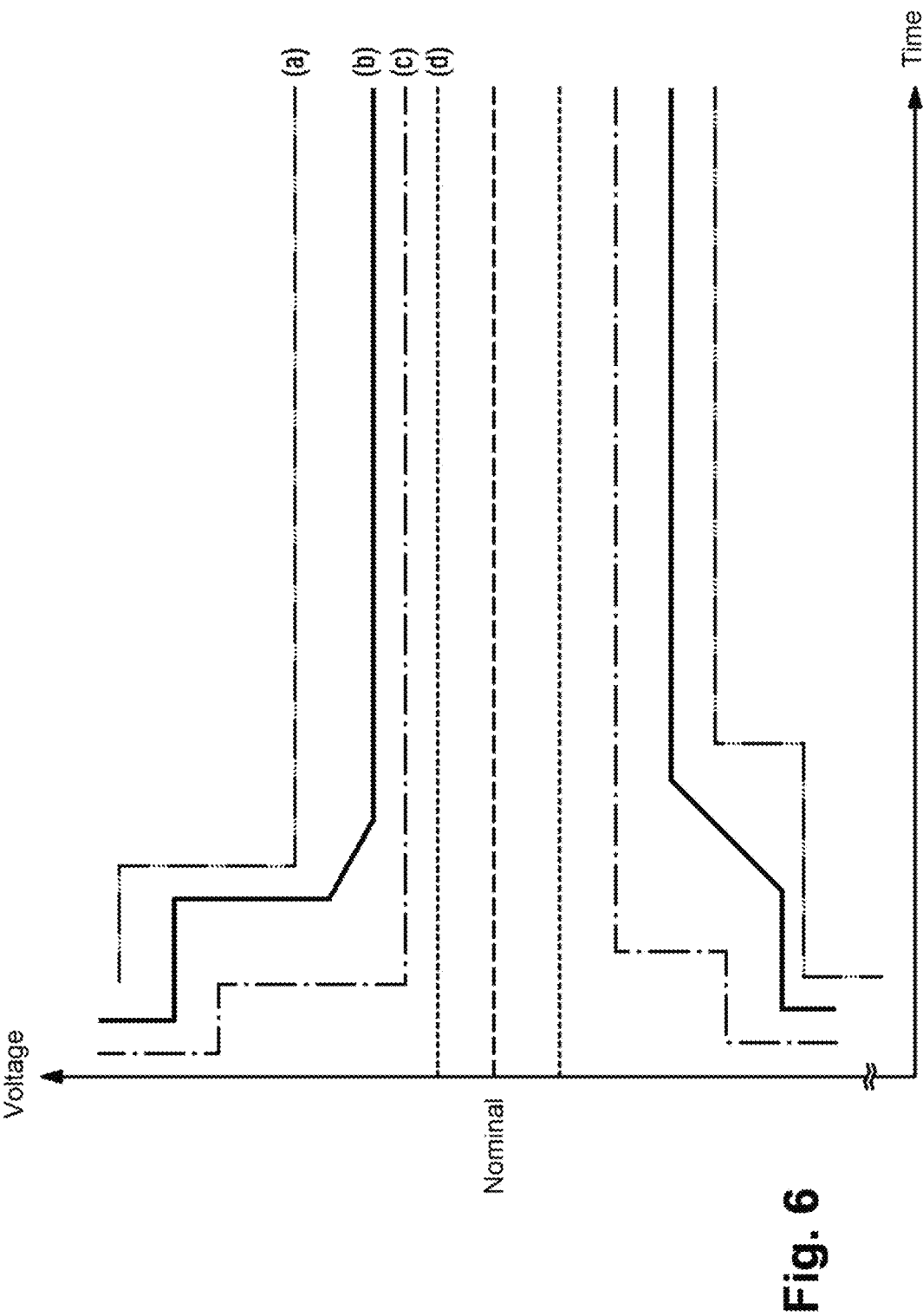
FIG. 6 illustrates a plurality of different templates to regulate the voltage of an electrical bus.

In one embodiment for an electrical system 100, 200 comprising a plurality of electrical power sources, such as illustrated in FIG. 1 or in FIG. 4, the control method E is implemented by each controller 141, 142, 143, 241, 242, 243, 244 of each of the electrical power sources 111, 112, 113, 211, 212, 213, 214. In addition, each controller 141, 142, 143, 241, 242, 243, 244 implements the control method E by means of a template particular thereto, each template differing from the other templates as illustrated in FIG. 6. In other words, a first template used by a first controller 141, 241 of a first electrical power source 111, 211 differs from a second template of a second controller 142, 242 of a second electrical power source 112, 212. As can be seen in FIG. 6, two templates differ if their limits differ i.e. they do not merge even if sporadically (or in part) they may cross or overlap each other. Also, a template can contain another i.e. the values associated with the limits of one template may lie within the limits of another template. Additionally, when two templates differ, their limits are represented by separate lines within a diagram giving voltage change over time, as illustrated for example in FIG. 6. As can be seen in FIG. 6, each template has limits which evolve in similar or very different manner to the limits of other templates, a constant voltage value after a time lapse possibly being differently defined according to template, the constant voltage value itself possibly being reached following differently evolving limits according to template. Through the use of different (i.e. separate) templates, it is possible selectively to control (or give priority to) one and/or other of the electrical power sources 111, 112, 113, 211, 212, 213, 214, for the purpose of regulating voltage. The electrical power source 111, 112, 113, 211, 212, 213, 214 having limits the closest to the nominal voltage of the template will be chosen by the control method E to regulate the voltage of the electrical bus

130, 231, 232, before the others, these others only being included in this regulation step if the effort contributed by the electrical power source 111, 112, 113, 211, 212, 213, 214 first requested for regulation is insufficient and/or the capacities of this electrical power source 111, 112, 113, 211, 212, 213, 214 are unable to remedy the fault causing the voltage of the electrical bus 130, 231, 232 to drift so much. Evidently, the defining of the template of each controller 141, 142, 143, 241, 242, 243, 244 allows determining of the selection dynamics of the electrical power sources 111, 112, 113, 211, 212, 213, 214 when the electrical system 100, 200 is in operation, to guarantee the stability of the voltage of the electrical bus a 130, 231, 232. At all events, each template of each controller 142, 143, 241, 242, 243, 244 is located within the template of the electrical bus 130, 231, 232, to ensure that the voltage is never able to lie outside the limits of this template, even if all the electrical power sources 111, 112, 113, 211, 212, 213, 214 receive a request in this respect.

By means of the control method E, voltage protection can be obtained for electrical systems such as those of decentralized multi-source type. By forcing at least one electrical power source 111, 112, 113, 211, 212, 213, 214 of the electrical system 100, 200 to shift to regulation of the voltage mode, irrespective of the operating setpoints it may receive, and insofar as it is compatible with regulation of the voltage, the balance between generation and consumption of electric energy is more easily obtained within the electrical system 100, 200, typically by ensuring that the voltage of the electrical bus 130, 231, 232 remains contained within the template. It is therefore no longer possible for the electrical system 100, 200 to find itself in a state in which there is drift in the voltage of the electrical bus 130, 231, 232 without any electrical power source 111, 112, 113, 211, 212, 213, 214 being operative to control this voltage. With said control method E it is possible for example, in the event of perturbed balance of the voltage of the electrical bus 130, 231, 232, to prevent the electrical system 100, 200 cutting of power from some electrical receivers 121, 122, 221, 222, 223, 224 for protection thereof (as is the case for example in electrical systems having UV relays (Under Voltage) or OV relays (Over Voltage). In this manner, all the electrical receivers 121, 122, 221, 222, 223, 224 are maintained in operation regardless of circumstances, which guarantees better robustness and better availability of the electrical system 100, 200. In addition, with the control method E, it is no longer necessary to carry out prior determination of the sharing strategy of electric power injected by the electrical power sources 111, 112, 113, 211, 212, 213, 214 onto the electrical bus 130, 231, 232 to guarantee the stability of the latter, said sharing necessarily being approximate since it generally takes into account the estimated performance of the electrical power sources 111, 112, 113, 211, 212, 213, 214, and is based on a limited number of prior experiments. The control method E therefore allows simplification of this protection of the electrical system 100, 200, for example by relieving the control device, 250, 260 of the task of allocating sharing of electric power between the electrical power sources 111, 112, 113, 211, 212, 213, 214. In addition, said electrical system 100, 200 through implementation of the control method E, has excellent rapid response to keep the voltage of the electrical bus, 231, 232 at all times within the limits of its template. As a result, voltage protection is extremely rapid. The systematic recourse to and/or wait for instructions from the control devices 150, 250, 260 could take too much time, causing voltage to move outside the template limits. The control method E therefore provides voltage protection for the electrical system 100, 200. Under nominal operation the voltage is properly regulated, but in the event of a problem the control method E provides rapid voltage protection to prevent voltage exceeding the voltage template limits should the control devices 150, 250, 260, nonetheless of top-level, not react sufficiently fast via exchanges of information. Total loss of the electrical system 100, 200 is therefore prevented.

The control method E just described, when implemented by the electrical system 200 illustrated in FIG. 4, allows preventing of the type of abnormal operation previously described.

For example, each controller 241, 242, 243, 244 comprises a processor (not illustrated) configured to implement the control method E previously described by means of a template particular thereto. Typically for the templates illustrated in FIG. 6, template (a) would be associated with the first assembly 211, template (b) would be associated with the second assembly 212, template (c) would be associated with the third assembly 213, and template (d) would be associated with the fourth assembly 214. In the event of failure(s) of the electrical system 200 leading to voltage drift on the electrical bus 231, 232, it is preferable that the first assembly 211 and second assembly 212 should heed their operating setpoints for as long as possible, having regard to the electric power they are able to develop. Similarly, in an example of embodiment of the control method E in which the third assembly 213 has received setpoint instructions to recharge the battery 2130, but it happens that the voltage of the electrical bus 231, 232 has dropped, it is then preferable first to request the third assembly 213 to discharge the battery 2130 to restore the voltage of the electrical bus 231, 232 rather than continuing with charging the battery 2130 with electric power extracted from the high pressure spool 12, 14, 18 and/or low pressure spool 10, 11, 15, 17.

Figure 7:
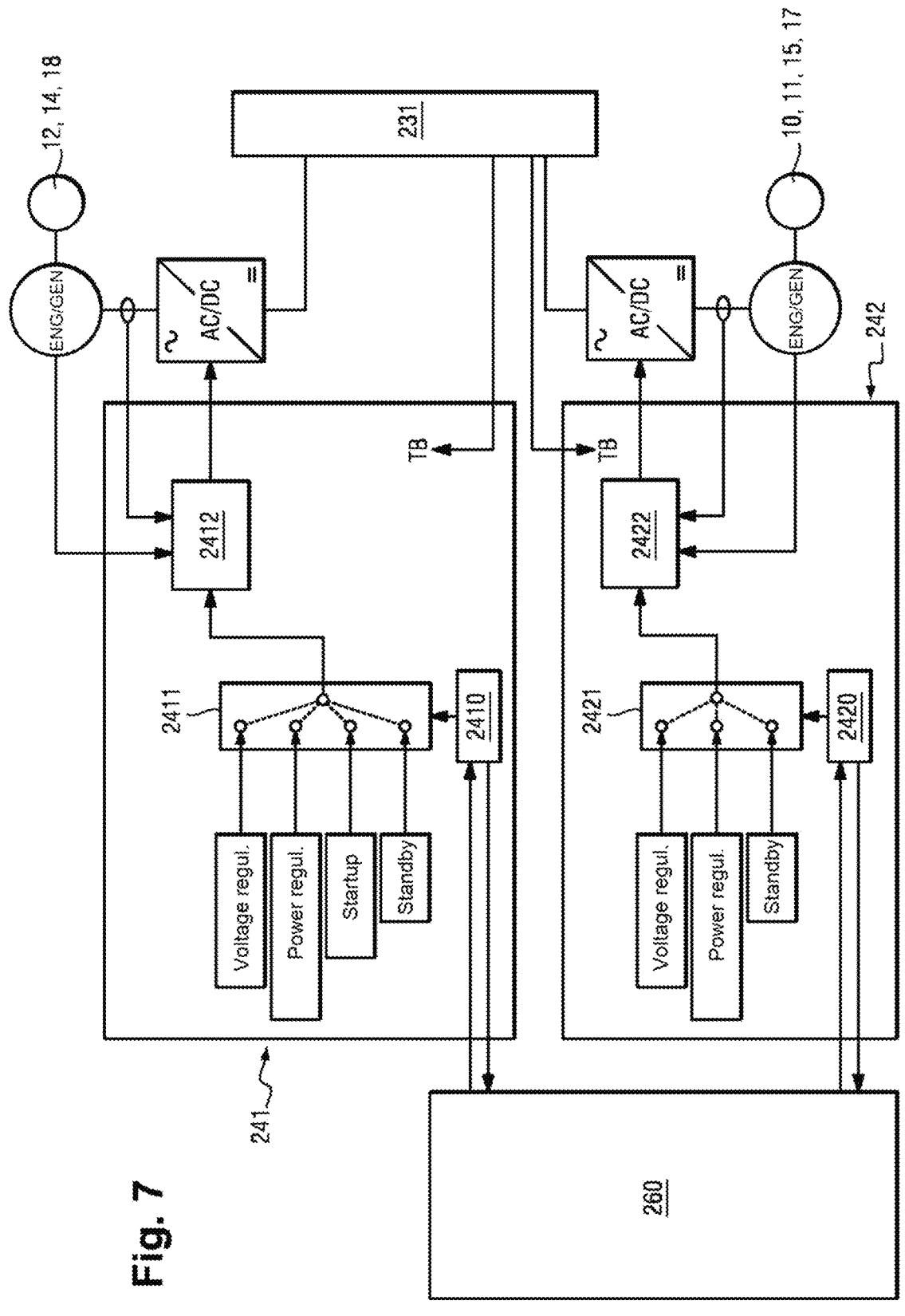
FIG. 7 schematically illustrates one portion of the electrical system illustrated in FIG. 4.

FIG. 7 more specifically illustrates the interactions between the control device 260 and each of the controllers 241, 242 of the first assembly 211 and second assembly 212.

As can be seen in FIG. 7, each of the first controller 241 and second controller 242 comprises several modules 2410, 2411, 2412, 2420, 2421, 2422 providing control over the behaviour of the first electrical power source (first assembly 211 here) and second electrical power source (second assembly 212 here). Each of these modules 2410, 2411, 2412, 2420, 2421, 2422 interacts with the others by means of communication signals represented by the arrows in FIG. 7. In addition, these modules have access to the measurement of the voltage TB of the electrical bus 231, 232. Modules 2410, 2411, 2412, 2420, 2421, 2422 particularly comprise: a module 2410, 2420 controlling the operating mode of the electrical power source 211, 212, a module 2411, 2421 selecting the control reference associated with the operating mode requested of the electrical power source 211, 212, and a module 2412, 2422 controlling the electrical signal exchanged between the electrical power source 211, 212 and the electrical bus 231, 232.

The module 2410, 2420 controlling the operating mode of the electrical power source 211, 212 implements the previously described control method E. Typically, the first assembly 211 can operate in the following modes: regulation of the voltage, power regulation, startup of the engine 1, standby. The second assembly 212 is able to operate in the following modes: regulation of the voltage, power regulation, standby. In regulation of the voltage mode, an electrical power source 211, 212 injects into and/or extracts from the electrical bus 232 the electric power needed to maintain a given voltage level (typically in accordance with the template associated with the electrical power source 211, 212 following the previously described control method E) within the electrical bus 231, 232. In power regulation mode, the electrical power source 211, 212 injects into and/or extracts from the electrical bus 231, 232 a given electric power (i.e. previously determined). In standby mode, an electrical power source does not interact with the electrical bus 231, 232. In startup mode, the first assembly 211 extracts from the electrical bus 231, 232, the electric power needed to start up the high pressure spool 12, 14, 18.

Once the decision is taken by the selection module 2411, 2421, this module communicates the control reference to the module controlling the electrical signal 2412, 2422, which controls the converter.

The decision is controlled by the mode controlling module 2410, 2420, which sets in motion the following steps of the previously described control method E: receiving E1 an operating setpoint for the electrical power source 211, 212, receiving E2 a measurement of the voltage TB of the electrical bus 231, 232, comparing E3 the measured voltage TB with a template having limits of voltage change over time, controlling E4 the electrical power source 211, 212, and transmitting information E5 to the aircraft control device 260 concerning the application or non-application of the operating setpoint by the electrical power source 211, 212.

The invention claimed is:

1. A method comprising:

receiving an operation instruction for an electrical power source of an electrical system;

receiving an upper limit and a lower limit for an evolution over time of a voltage of an electrical bus of the electrical system when the electrical system operates, wherein the electrical bus connects the electrical power source to an electrical receiver of the electrical system, and wherein the upper limit is higher than the lower limit;

receiving a measurement of a voltage;

based on the received measurement of the voltage being lower than the received lower limit, controlling the electrical power source such that the electrical power source regulates the voltage until the evolution over time of the voltage lies within the received upper limit and the received lower limit;

based on the received measurement of the voltage being higher than the received lower limit and lower than the received upper limit, controlling the electrical power source such that the electrical power source applies the received operation instruction; and based on the received measurement of the voltage being higher than the received upper limit, controlling the electrical power source such that the electrical power source regulates the voltage until the evolution over time of the voltage lies within the received upper limit and the received lower limit, wherein the method is implemented by a controller of the electrical power source.

2. The method of claim 1, wherein the electrical power source regulates the voltage by injecting an electric power onto the electrical bus.

3. The method of claim 1, wherein the electrical power source regulates the voltage by extracting an electric power from the electrical bus.

4. The method of claim 1, wherein the operation instruction is received from a control device of the electrical system, the method further comprising a step of informing to the control device whether the electrical power source has applied the operation instruction or not.

5. A method comprising:

receiving a first operation instruction for a first electrical power source of an electrical system;

receiving a second operation instruction for a second electrical power source of the electrical system;

receiving a first upper limit, a second upper limit, a first lower limit and a second lower limit for an evolution over time of a voltage of an electrical bus of the electrical system when the electrical system operates, wherein the electrical bus connects the first electrical power source and the second electrical power source to an electrical receiver of the electrical system, and wherein the first upper limit is higher than the first lower limit, wherein the second upper limit is higher than the second lower limit, and wherein at least one of the first upper limit and the first lower limit is distinct from the second upper limit and the second lower limit, respectively;

receiving a measurement of the voltage;

based on the received measurement of the voltage being lower than the received first lower limit, controlling the first electrical power source by a first controller of the first electrical power source such that the first electrical power source regulates the voltage until the evolution over time of the voltage lies within the received first upper limit and the received first lower limit;

based on the received measurement of the voltage being higher than the received first lower limit and lower than the received first upper limit, controlling the first electrical power source by the first controller such that the first electrical power source applies the received first operation instruction; and based on the received measurement of the voltage being higher than the received first upper limit, controlling the first electrical power source by the first controller such that the first electrical power source regulates the voltage until the evolution over time of the voltage lies within the received first upper limit and the received first lower limit;

based on the received measurement of the voltage being lower than the received second lower limit, controlling the second electrical power source by a second controller of the second electrical power source such that the second electrical power source regulates the voltage until the evolution over time of the voltage lies within the received second upper limit and the received second lower limit;

based on the received measurement of the voltage being higher than the received second lower limit and lower than the received second upper limit, controlling the second electrical power source by the second controller such that the second electrical power source applies the received second operation instruction; and based on the received measurement of the voltage being higher than the received second upper limit, controlling the second electrical power source by the second controller such that the second electrical power source regulates the voltage until the evolution over time of the voltage lies within the received second upper limit and the received second lower limit.

6. A non-transitory computer-readable medium with instructions stored thereon that, when executed by a processor of the controller of the electrical power source, implement the method of claim 1.

7. A non-transitory computer-readable medium with instructions stored thereon, that executes the method by a processor of the second controller claim 1.

* * * * *